US012643260B2

(12) United States Patent
Gravelle

(10) Patent No.: US 12,643,260 B2
(45) Date of Patent: Jun. 2, 2026

(54) CONCRETE GARDEN BED MOLD

(71) Applicant: Kent Douglas Gravelle, Duncan (CA)

(72) Inventor: Kent Douglas Gravelle, Duncan (CA)

( * ) Notice: Subject to any disclaimer, the term of this patent is extended or adjusted under 35 U.S.C. 154(b) by 71 days.

(21) Appl. No.: 18/936,750

(22) Filed: Nov. 4, 2024

(65) Prior Publication Data

US 2025/0332758 A1 Oct. 30, 2025

Related U.S. Application Data

(60) Provisional application No. 63/640,115, filed on Apr. 29, 2024.

(51) Int. Cl.
*B28B 7/00* (2006.01)
*B28B 7/16* (2006.01)

(52) U.S. Cl.
CPC ............ *B28B 7/0079* (2013.01); *B28B 7/162* (2013.01)

(58) Field of Classification Search
CPC ......... B28B 7/16; B28B 7/162; B28B 7/0064; B28B 7/0079; B28B 7/183; B28B 7/348
See application file for complete search history.

(56) References Cited

U.S. PATENT DOCUMENTS 247,502 A * 9/1881 Koeppe ................ A61G 17/007 249/161
1,339,596 A * 5/1920 Depatie ..................... E04B 2/04 D25/113
1,557,946 A * 10/1925 Smith ................... B28B 7/0014 249/166
1,817,391 A * 8/1931 Miller ....................... B28B 7/16 249/104
2,532,049 A * 11/1950 Wittke .................. B28B 7/0064 249/102
2,713,710 A * 7/1955 Holland ................ B28B 7/0064 249/67
2,720,104 A * 10/1955 Cameron .................. E04B 2/42 52/439
3,025,641 A * 3/1962 Ahtiainen ................. E04B 2/04 52/436
3,220,141 A * 11/1965 Goss, III .............. A63H 33/084 446/124
3,534,518 A * 10/1970 Zagray .................... F27B 9/061 52/258
3,587,143 A * 6/1971 Sonneville ................ B28B 7/16 249/97
3,918,877 A * 11/1975 Pickett .................... B28B 7/162 249/161

(Continued)

FOREIGN PATENT DOCUMENTS

CA 2463194 A1 10/2004

*Primary Examiner* — Emmanuel S Luk

(57) ABSTRACT

The concrete garden bed mold is plastic mold that creates concrete walls for a garden bed. An objective of the concrete garden bed mold is to provide users with a mold that easily releases the concrete block once cured within the mold. The concrete garden bed mold intends to provide users with a device that can create concrete molds with cylindrical holes to allow for a securing rebar to traverse through the concrete, securing the wall in place. To accomplish this the concrete garden bed mold has a mold cavity, a flat top surface, and tapered walls. The tapered walls ensure the created interlocking garden bed wall does not get stuck within the mold cavity as the concrete cures.

15 Claims, 10 Drawing Sheets

(56) References Cited

U.S. PATENT DOCUMENTS

| | | | | | |
|---|---|---|---|---|---|
| 4,141,532 | A * | 2/1979 | Wall | B28B 7/0064 | 249/126 |
| 4,515,741 | A * | 5/1985 | Korpijaakko | B28B 7/16 | 264/318 |
| 4,627,764 | A * | 12/1986 | Scheiwiller | B28B 7/0064 | 404/39 |
| 5,174,910 | A * | 12/1992 | Pita | E04G 15/063 | 249/176 |
| 5,240,671 | A * | 8/1993 | Carey | C04B 41/009 | 264/633 |
| 5,402,609 | A * | 4/1995 | Kelley, Jr. | E02D 29/025 | 52/561 |
| 5,647,185 | A * | 7/1997 | Forlini | E04B 2/06 | 52/607 |
| 5,817,248 | A * | 10/1998 | Forlini | B28B 7/0044 | 249/161 |
| 5,934,037 | A * | 8/1999 | Bundra | E04B 2/08 | 52/603 |
| 6,032,424 | A * | 3/2000 | Dial, Jr. | B28B 7/10 | 52/439 |
| 6,082,933 | A * | 7/2000 | Maguire | E02D 29/025 | 52/592.6 |
| D457,971 | S * | 5/2002 | Schrader | D25/113 | |
| 9,145,676 | B2 * | 9/2015 | Long | E04C 1/395 | |
| 2002/0083658 | A1 * | 7/2002 | Dial, Jr. | E04B 2/8629 | 52/596 |
| 2005/0016123 | A1 * | 1/2005 | Jucha | B28B 7/346 | 52/749.1 |
| 2005/0034379 | A1 * | 2/2005 | Smirnov | B28B 7/0079 | 52/69 |
| 2005/0086892 | A1 * | 4/2005 | Dean | E04C 1/395 | 405/286 |
| 2005/0211871 | A1 * | 9/2005 | Ness | B28B 7/364 | 249/155 |
| 2005/0252101 | A1 * | 11/2005 | Anderson | A01G 9/28 | 52/102 |
| 2006/0179779 | A1 * | 8/2006 | Ness | B28B 23/0087 | 249/155 |
| 2007/0110524 | A1 * | 5/2007 | MacDonald | E02D 29/0266 | 405/262 |
| 2008/0315458 | A1 | 12/2008 | Ott | | |
| 2009/0185870 | A1 * | 7/2009 | Shaw | E02D 29/0241 | 405/284 |
| 2009/0301028 | A1 * | 12/2009 | Pfoff | E04B 2/06 | 52/741.11 |
| 2010/0092598 | A1 * | 4/2010 | Ness | B28B 7/0064 | 425/419 |
| 2010/0201018 | A1 * | 8/2010 | Yoshioka | C04B 35/632 | 249/64 |
| 2013/0279983 | A1 * | 10/2013 | Benton, Jr. | B28B 7/0064 | 405/20 |
| 2016/0326743 | A1 * | 11/2016 | Matys | B28B 7/0097 | |
| 2018/0355611 | A1 * | 12/2018 | Sadler | A01G 9/00 | |
| 2019/0070750 | A1 | 3/2019 | Ott et al. | | |
| 2021/0245394 | A1 * | 8/2021 | Rossart | B28B 7/162 | |
| 2021/0268689 | A1 * | 9/2021 | Van Doren | E04G 11/085 | |

* cited by examiner

CONCRETE GARDEN BED MOLD

FIELD OF THE INVENTION

The present invention relates generally to a concrete garden bed mold. More specifically, the present invention is a device that is a plastic vacuum form mold that creates a linking concrete block.

BACKGROUND OF THE INVENTION

Concrete molds serve as crucial tools in construction and crafting, enabling the precise shaping and forming of concrete into various designs. Used extensively in construction projects, these molds contribute to the production of uniform and accurate components such as columns, beams, and decorative architectural features. In landscaping, molds are employed to create concrete intricate designs, enhancing outdoor spaces. Beyond construction, molds play a significant role in crafting countertops, sinks, and artistic elements, allowing for customization and unique design expressions. Industries producing precast concrete products rely on molds for efficient and standardized manufacturing processes. DIY enthusiasts also utilize molds for a range of projects, from planters to decorative tiles. Flexible molds made from materials like silicone or rubber are favored for intricate designs, ensuring easy demolding and preservation of fine details. Overall, concrete molds offer versatility, efficiency, and the opportunity for creative expression in various applications, from large-scale construction to small-scale artistic endeavors.

An objective of the present invention is to provide users with a vacuum mold, to help create a concrete garden bed interlocking wall. The present invention intends to provide users with a device that can create one wall of a four-sided garden bed. In order to accomplish that, a preferred embodiment of the present invention comprises a mold cavity 1, a flat top surface 2, and a plurality of tapered walls 3. Further, the mold cavity 1 provides an area for the user to pour in liquid concrete to create the concrete block. Thus, the present invention is a plastic mold for creating a concrete interlocking garden bed wall 4.

DETAILED DESCRIPTION OF THE INVENTION

Figure 1:
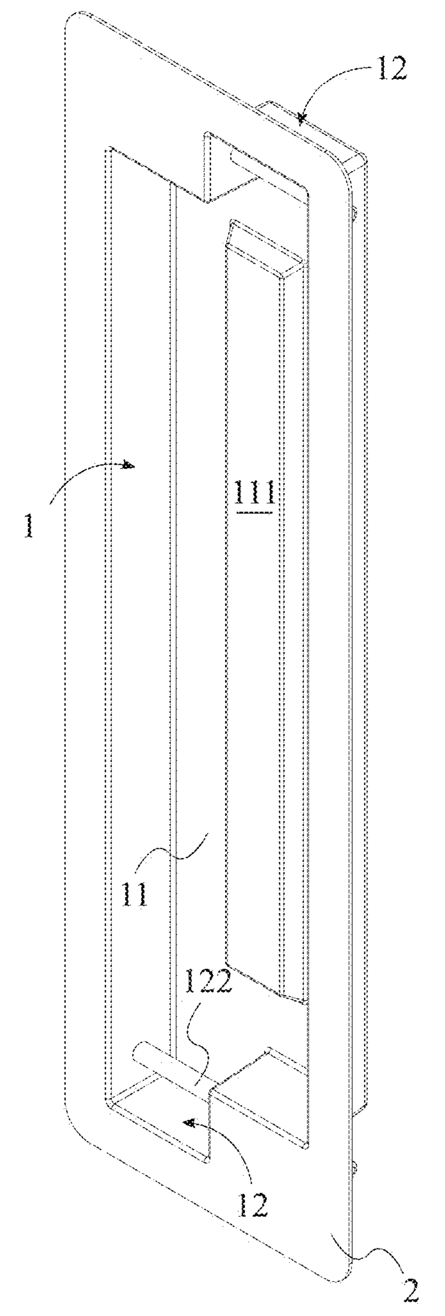
FIG. 1 is a top front perspective view of the present invention.

All illustrations of the drawings are for the purpose of describing selected versions of the present invention and are not intended to limit the scope of the present invention.

The present invention is a plastic vacuum formed mold to help create a concrete panel for a garden bed. The present invention seeks to provide users with a device that can create interlocking concrete blocks to form a raised garden bed. In order to accomplish this the present invention comprises a mold cavity 1 that receives a liquid concrete mixture. Further, the flat top surface 2 provides a flat surface at the top of the mold cavity 1. Additionally, the plurality of tapered walls 3 allows for the present invention to move and let the cured concrete easily be removed. Thus, the present invention is a plastic mold for creating a concrete interlocking garden bed wall 4.

As shown in FIG. 1-10, the present invention is a plastic mold that creates concrete walls for a garden bed. An objective of the present invention is to provide users with a mold that easily releases the concrete once cured within the mold. The present invention intends to provide users with a device that can create concrete molds with cylindrical holes to allow for a securing rebar to traverse through the concrete, securing the wall in place. To accomplish this the present invention comprises a mold cavity 1, a flat top surface 2, and a plurality of tapered walls 3. The mold cavity 1 is positioned within the center of the present invention with the flat top surface 2 being positioned along the top opening 13 of the mold cavity 1 and the plurality of tapered walls 3 being positioned along the sides of the mold cavity 1. Thus, the present invention is a plastic mold for creating a concrete interlocking garden bed wall 4.

The present invention is a concrete garden bed mold that comprises a mold cavity 1, a flat top surface 2, and a plurality of tapered walls 3. The present invention is designed with an ABS mold plastic or various other plastic durable materials. The mold cavity 1 is an opening wherein concrete is poured to create an interlocking garden bed wall 4. The mold cavity 1 is designed with a rectangular shape that receives liquid concrete. The mold cavity 1 comprises a center portion 11 and a plurality of extended sides 12 as seen in FIG. 1. Each of the plurality of tapered walls 3 comprises a curved edge 31. The mold cavity 1 is positioned centrally within the concrete garden bed mold. The flat top surface 2 is positioned along the top opening 13 of the mold cavity 1. The plurality of tapered walls 3 forms the sides of the mold cavity 1. The center portion 11 forms the base of the mold cavity 1. The mold cavity 1 receives a liquid concrete mixture. The mold cavity 1 creates an interlocking garden bed wall 4 after the liquid concrete mixture has cured.

In reference to FIG. 1, the center portion 11 is rectangular shaped. As a result, the center portion 11 creates the base of the interlocking garden bed wall 4. The center portion 11 further comprises a raised area 111. Consequently, the raised area 111 reduces the area of the interlocking garden bed wall 4 created by the mold cavity 1. The raised area 111 is positioned centrally within the center portion 11. Accordingly, the raise portion creates a short hollowed out section of the interlocking garden bed wall 4 once the concrete mixture has cured. The raised area 111 protrudes forwards along the center portion 11.

Figure 10:
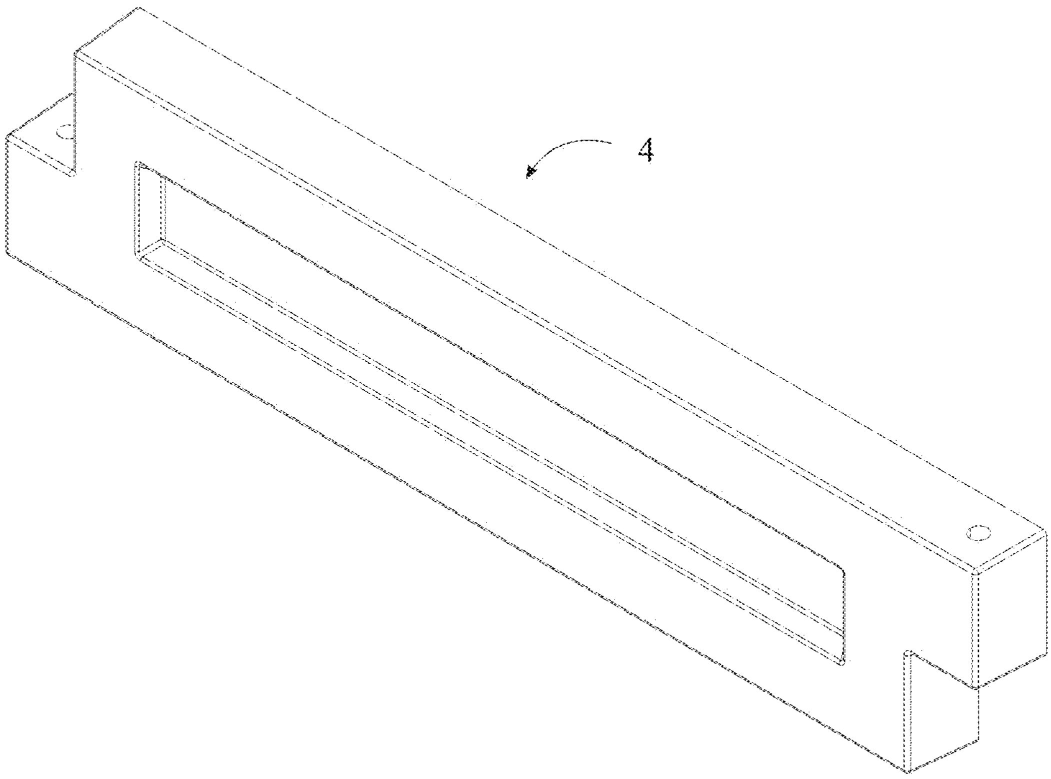
FIG. 10 is a top front perspective view of the interlocking garden bed wall created by the present invention.

Further, the raised area 111 reduces the weight of the interlocking garden bed wall 4 created by the mold cavity 1. Thus, the volume of the interlocking garden bed wall 4 is reduced as seen in FIG. 10, saving concrete and curing time. The raised area 111 does not inhibit the structural integrity of the interlocking garden bed wall 4 created by the mold cavity 1.

Figure 3:
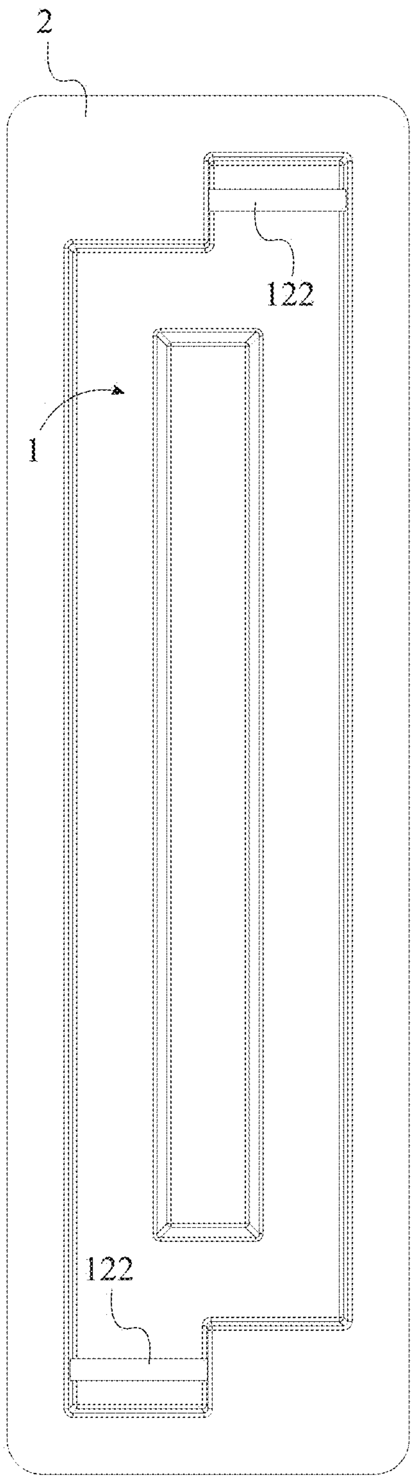
FIG. 3 is a front view of the present invention.

In reference to FIG. 3, the plurality of extended sides 12 extends from the left and right side of the mold cavity 1. The plurality of extended sides 12 forms a rectangular section along the top left side and the bottom right side of the mold cavity 1. So, the plurality of extended sides 12 forms a layered shape as seen in FIG. 3.

Further, the plurality of extended sides 12 enables the interlocking garden bed wall 4 created by the mold cavity 1 to have an interlocking section to form one wall of a four-sided concrete garden bed.

Figure 2:
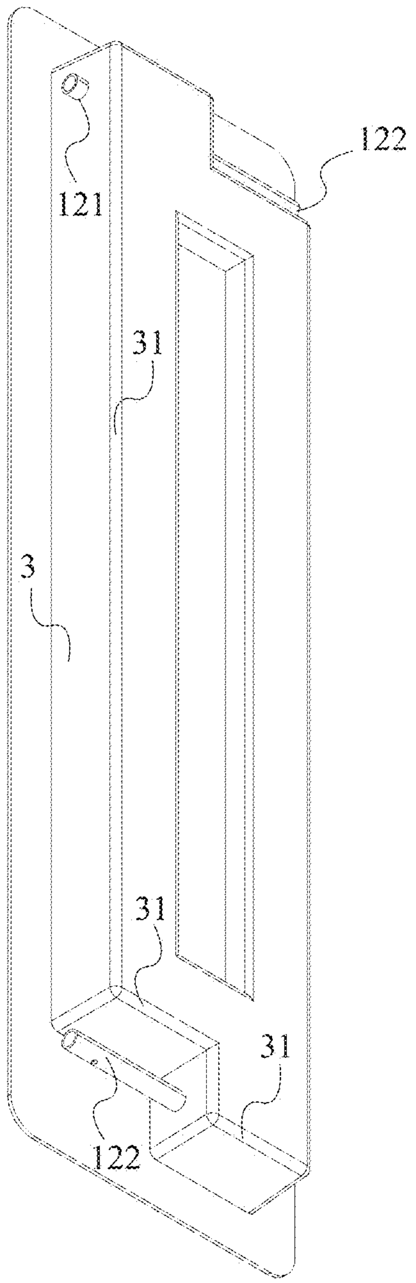
FIG. 2 is a bottom rear perspective view of the present invention.

Furthermore, each of the plurality of extended sides 12 further comprises a plurality of holes 121 and a plurality of rods 122. The plurality of holes 121 traverses through the top and bottom of the plurality of extended sides 12. As a result, each of the plurality of rods 122 can pass through each of the plurality of holes 121 as seen in FIG. 2. The plurality of rods 122 engages with the plurality of holes 121. The plurality of rods 122 traverses through each of the plurality of extended sides 12. Consequently, the plurality of rods 122 ensures that the interlocking garden bed wall 4 has holes along each end, enabling stakes or rebar to pass through, linking each of the interlocking garden bed wall 4s to each other to form various sized and shaped garden bed formations.

Figure 4:
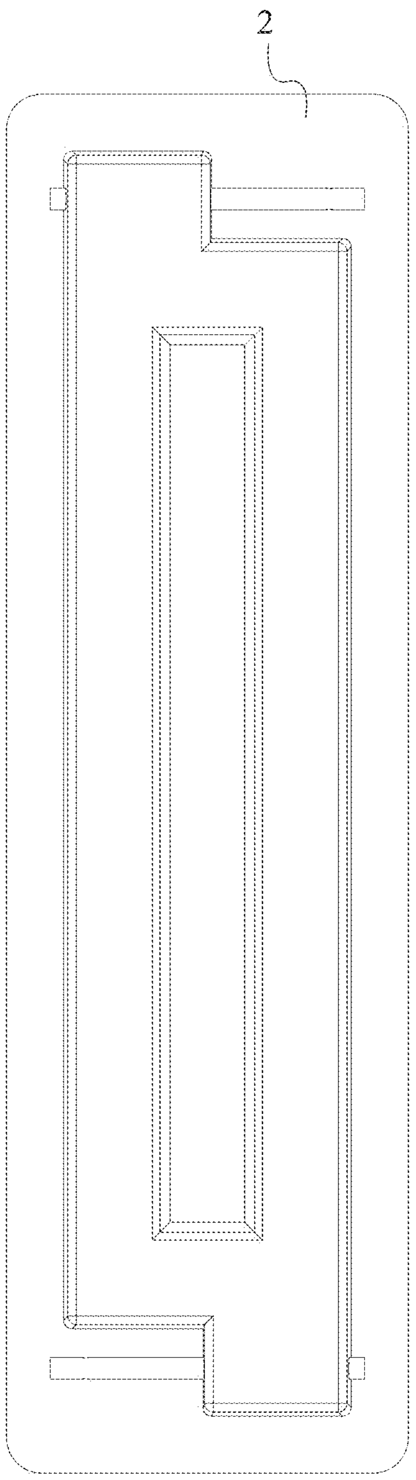
FIG. 4 is a rear view of the present invention.
Figure 5:
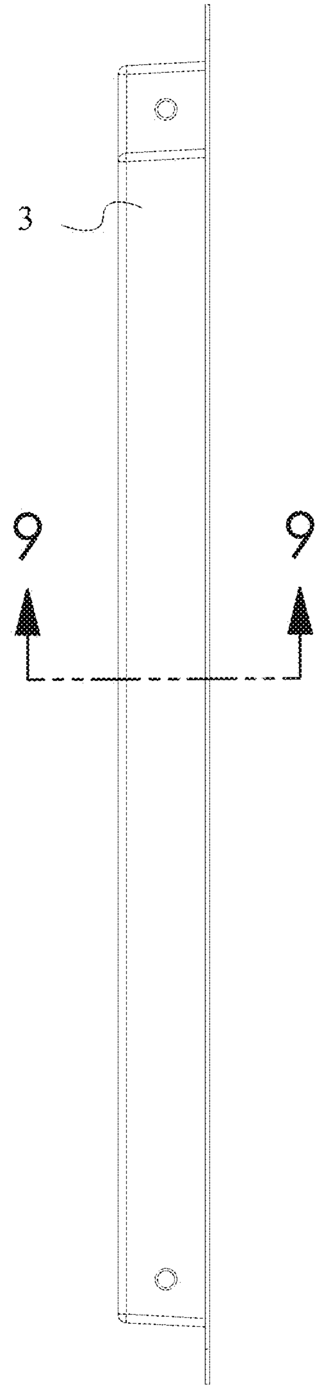
FIG. 5 is a right-side view of the present invention.
Figure 6:
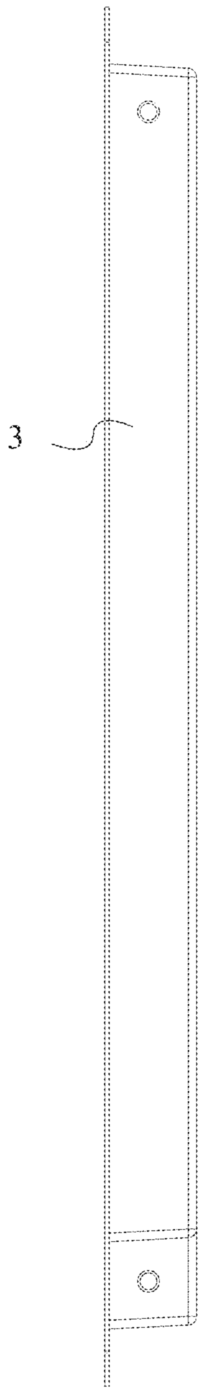
FIG. 6 is a left-side view of the present invention.
Figure 7:
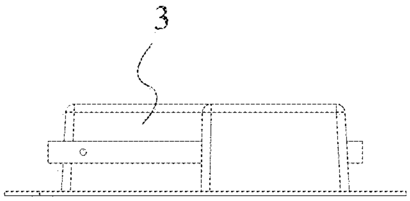
FIG. 7 is a top view of the present invention.
Figure 8:
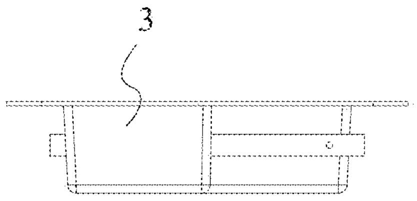
FIG. 8 is a bottom view of the present invention.

In reference to FIG. 4, the flat top surface 2 forms a flat base along the front of the concrete garden bed mold. The flat top surface 2 is a flat panel designed with an ABS material, plastic, or durable lightweight material that can form a mold. The flat top surface 2 connects to the front edges of the plurality of tapered walls 3. As a result, the flat top surface 2 is positioned along the front of the present invention and presents various labels or writings that can display measurements or logos.

Figure 9:
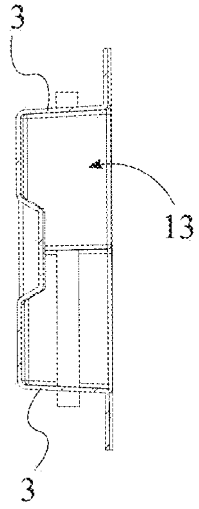
FIG. 9 is a cross-sectional view of the present invention.

As shown in FIG. 9, each of the plurality of tapered walls 3 comprises a curved edge 31. Each of the plurality of tapered walls 3 has a degree of draft from 1-5 degrees. Thus, the plurality of tapered walls 3 creates a slight angle as the plurality of tapered walls 3 traverses towards the opening of the mold cavity 1. Each of the plurality of tapered walls 3 forms an angled wall along the sides of the mold cavity 1. So, the plurality of tapered walls 3 ensures for the present invention to move as a concrete mixture is poured into the mold cavity 1, preventing the interlocking garden bed mold from getting stuck within the present invention once cured. The curved edge 31 provides a non-sharp edge wherein the flat top surface 2 engages with the plurality of tapered walls 3 and wherein the plurality of tapered walls 3 engages with the center portion 11. The curved edge 31 ensures the interlocking garden bed wall 4 created by the mold cavity 1 has curved edges and corners. So, the resulting interlocking garden bed wall 4 does not have any sharp edges.

Although the invention has been explained in relation to its preferred embodiment, it is to be understood that many other possible modifications and variations can be made without departing from the spirit and scope of the invention as hereinafter claimed.

What is claimed is:

1. A concrete garden bed mold comprising:

a mold cavity;

a flat top surface;

a plurality of tapered walls;

the mold cavity comprising a center portion and a plurality of extended sides;

each of the plurality of tapered walls comprising a curved edge;

the mold cavity being positioned centrally within the concrete garden bed mold;

the flat top surface being positioned along the top opening of the mold cavity;

the plurality of tapered walls forming the sides of the mold cavity;

the center portion forming the base of the mold cavity;

the mold cavity receiving a liquid concrete mixture;

the mold cavity creating an interlocking garden bed wall;

the plurality of extended sides extending from the left and right side of the mold cavity;

the plurality of extended sides forming a rectangular section along the top left side and the bottom right side of the mold cavity;

each of the plurality of extended sides further comprising a plurality of holes and a plurality of rods;

the plurality of holes traversing through the top and bottom of the plurality of extended sides;

the plurality of rods engaging with the plurality of holes; and the plurality of rods traversing through each of the plurality of extended sides.

2. The concrete garden bed mold as claimed in claim 1 comprising:

the center portion being rectangular shaped;

the center portion further comprising a raised area;

the raised area being positioned centrally within the center portion; and the raised area protruding forwards along the center portion.

3. The concrete garden bed mold as claimed in claim 2 comprising:

the raised area reducing the weight of the interlocking garden bed wall created by the mold cavity; and the raised area does not inhibit the structural integrity of the interlocking garden bed wall created by the mold cavity.

4. The concrete garden bed mold as claimed in claim 1 wherein the plurality of extended sides enabling the interlocking garden bed wall created by the mold cavity to have an interlocking section to form one wall of a four sided concrete garden bed.

5. The concrete garden bed mold as claimed in claim 1 comprising:

the flat top surface forming a flat base along the front of the concrete garden bed mold; and the flat top surface connecting to the front edges of the plurality of tapered walls.

6. The concrete garden bed mold as claimed in claim 1 comprising:

each of the plurality of tapered walls forming an angled wall along the sides of the mold cavity.

7. The concrete garden bed mold as claimed in claim 6 comprising:

the curved edge providing a non-sharp edge wherein the flat top surface engages with the plurality of tapered walls and wherein the plurality of tapered walls engages with the center portion; and the curved edge ensuring the interlocking garden bed wall created by the mold cavity has curved edges and corners.

8. A concrete garden bed mold comprising:

a mold cavity;

a flat top surface;

a plurality of tapered walls;

the mold cavity comprising a center portion and a plurality of extended sides;

each of the plurality of tapered walls comprising a curved edge;

the mold cavity being positioned centrally within the concrete garden bed mold;

the flat top surface being positioned along the top opening of the mold cavity;

the plurality of tapered walls forming the sides of the mold cavity;

the center portion forming the base of the mold cavity;

the mold cavity receiving a liquid concrete mixture;

the mold cavity creating an interlocking garden bed wall;

the center portion being rectangular shaped;

the center portion further comprising a raised area;

the raised area being positioned centrally within the center portion;

the raised area protruding forwards along the center portion;

the plurality of extended sides extending from the left and right side of the mold cavity;

the plurality of extended sides forming a rectangular section along the top left side and the bottom right side of the mold cavity;

each of the plurality of extended sides further comprising a plurality of holes and a plurality of rods;

the plurality of holes traversing through the top and bottom of the plurality of extended sides;

the plurality of rods engaging with the plurality of holes; and the plurality of rods traversing through each of the plurality of extended sides.

9. The concrete garden bed mold as claimed in claim 8 comprising:

the raised area reducing the weight of the interlocking garden bed wall created by the mold cavity; and the raised area does not inhibit the structural integrity of the interlocking garden bed wall created by the mold cavity.

10. The concrete garden bed mold as claimed in claim 8 wherein the plurality of extended sides enabling the interlocking garden bed wall created by the mold cavity to have an interlocking section to form one wall of a four sided concrete garden bed.

11. The concrete garden bed mold as claimed in claim 8 comprising:

the flat top surface forming a flat base along the front of the concrete garden bed mold; and the flat top surface connecting to the front edges of the plurality of tapered walls.

12. The concrete garden bed mold as claimed in claim 8 comprising:

each of the plurality of tapered walls forming an angled wall along the sides of the mold cavity;

the curved edge providing a non-sharp edge wherein the flat top surface engages with the plurality of tapered walls and wherein the plurality of tapered walls engages with the center portion; and the curved edge ensuring the interlocking garden bed wall created by the mold cavity has curved edges and corners.

13. A concrete garden bed mold comprising:

a mold cavity;

a flat top surface;

a plurality of tapered walls;

the mold cavity comprising a center portion and a plurality of extended sides;

each of the plurality of tapered walls comprising a curved edge;

the mold cavity being positioned centrally within the concrete garden bed mold;

the flat top surface being positioned along the top opening of the mold cavity;

the plurality of tapered walls forming the sides of the mold cavity;

the center portion forming the base of the mold cavity;

the mold cavity receiving a liquid concrete mixture;

the mold cavity creating an interlocking garden bed wall;

the center portion being rectangular shaped;

the center portion further comprising a raised area;

the raised area being positioned centrally within the center portion;

the raised area protruding forwards along the center portion;

the raised area reducing the weight of the interlocking garden bed wall created by the mold cavity;

the raised area does not inhibit the structural integrity of the interlocking garden bed wall created by the mold cavity;

the plurality of extended sides extending from the left and right side of the mold cavity;

the plurality of extended sides forming a rectangular section along the top left side and the bottom right side of the mold cavity;

the plurality of extended sides enabling the interlocking garden bed wall created by the mold cavity to have an interlocking section to form one wall of a four sided concrete garden bed;

each of the plurality of extended sides further comprising a plurality of holes and a plurality of rods;

the plurality of holes traversing through the top and bottom of the plurality of extended sides;

the plurality of rods engaging with the plurality of holes; and the plurality of rods traversing through each of the plurality of extended sides.

14. The concrete garden bed mold as claimed in claim 13 comprising:

the flat top surface forming a flat base along the front of the concrete garden bed mold; and the flat top surface connecting to the front edges of the plurality of tapered walls.

15. The concrete garden bed mold as claimed in claim 13 comprising:

each of the plurality of tapered walls forming an angled wall along the sides of the mold cavity;

the curved edge providing a non-sharp edge wherein the flat top surface engages with the plurality of tapered walls and wherein the plurality of tapered walls engages with the center portion; and the curved edge ensuring the interlocking garden bed wall created by the mold cavity has curved edges and corners.

* * * * *